United States Patent [19]
Frederick et al.

[11] Patent Number: 6,038,926
[45] Date of Patent: Mar. 21, 2000

[54] TDM ARRAY OF OPTICAL NON-ACOUSTIC PRESSURE SENSORS

[76] Inventors: Donald A. Frederick, 6027 Maury Ave., Woodland Hills, Calif. 91367; David B. Hall, 5165 Finehill Ave., La Crescenta, Calif. 91214

[21] Appl. No.: 08/923,707

[22] Filed: Sep. 4, 1997

[51] Int. Cl.[7] ................................ G01L 9/00; G01J 1/56; G01J 5/46
[52] U.S. Cl. ........................................ 73/705; 250/231.19
[58] Field of Search ...................... 250/227.14, 227.16, 250/227.21, 231.19; 73/705, 800; 367/140

[56] References Cited

U.S. PATENT DOCUMENTS

| | | | |
|---|---|---|---|
| 4,421,384 | 12/1983 | McMahon | 250/231.19 |
| 4,712,004 | 12/1987 | Spillman, Jr. | 250/231.19 |
| 4,991,150 | 2/1991 | Wixom | 367/140 |
| 5,031,987 | 7/1991 | Norling | 250/227.21 |

Primary Examiner—William Oen

[57] ABSTRACT

A pressure measuring device which utilizes an array of optical, non-acoustic pressure sensors with a laser light source which generates a pulsed light signal into a light transmitting cable, wherein the pulsed light signal propagates along the light transmitting cable through the array of optical pressure sensors. A plurality of optical couplers are attached to the light transmitting cable at multiple locations spaced apart from one another in order to branch off at least a portion of the pulsed light each location. Each of the plurality of optical couplers includes a respective optical pressure sensor and a pressure insensitive reflector, wherein the branched off portion of the pulsed light signal is transmitted into to both the optical pressure sensor and the reflector. Each optical pressure sensor reflects a pressure indicating signal back into the optical coupler, while the pressure insensitive reflector reflects a reference signal back into the optical coupler. The pressure indicating signal and the reference signal are reflected through the optical coupler into the light transmitting cable as a pair of non-overlapping pulsed signals, which are then retrieved from the light transmitting cable by a signal detector. The retrieved pressure indicating signal is compared with the retrieved reference signal to determine the pressure acting upon the optical pressure sensor.

19 Claims, 2 Drawing Sheets

TDM ARRAY OF OPTICAL NON-ACOUSTIC PRESSURE SENSORS

BACKGROUND OF THE INVENTION

1. Field of the Invention

The present invention relates generally to non-acoustic optical pressure sensors, and specifically to an array of non-acoustic optical pressure sensors for measuring a pressure at multiple locations along the path of the array.

2. Description of Related Art

In the field of reduced size pressure sensors, it is well known to use piezoresistive or capacitive readouts to measure a pressure. In the case of piezoresistive pressure sensors, a diaphragm is exposed to the applied pressure, and the mechanical strain on the diaphragm is measured to determine the amount of pressure acting on the diaphragm. Sensing the state of the mechanical strain in the diaphragm possesses a number of problems. For instance, this type of sensor has a large cross-sensitivity to packaging stress, which may limit the accuracy of the sensor. Furthermore, the resistive elements tend to be temperature sensitive at high temperatures rendering high-temperature applications to also be inaccurate.

Capacitive pressure sensors use a variable-gap capacitor positioned between a diaphragm and an adjacent second plate. As pressure acts on the diaphragm, the amount of deflection of the diaphragm is measured using the capacitance of the variable-gap capacitor to determine the pressure acting on the diaphragm. These pressure sensors also have numerous disadvantages. First, electricity is required to operate these sensors to obtain the required measurements. In some situations such as at remote locations requiring transmission over large distances, it is not convenient or plausible to supply a pressure sensor with electricity, so these types of pressure sensors may not always be readily utilized. Also, besides tending to be sensitive to packaging stress, they tend to be inaccurate in high-temperature applications due to the effects of temperature on their readings. Electrical sensors require electrical contacts formed of a conductive material to be attached to the sensor, which limits the possibilities for the type of material used in forming the contacts. Thus, in extreme environments, such as highly corrosive environments, it can be difficult and expensive to manufacture a pressure sensor having electrical contacts with the desired sensitivity while also being resistive to the corrosive environment.

Many of the current pressure sensors which are designed to be very accurate are extremely expensive. For instance, current pressure sensors using a quartz resonant frequency device, where the resonant frequency is a function of the pressure applied on the sensor, have a one foot depth accuracy at 0.5 psi. These resonant frequency pressure sensors are expensive and large. This makes them unsuitable for applications having a limited space.

In order to reduce the detrimental effects associated with electrical pressure sensors, contactless optical pressure sensors have been utilized to minimize the effects on the sensitivity of the pressure sensors by severe environments and elevated temperatures. Such optical pressure sensors utilize the interference phenomena on a wavelength of light to determine the pressure acting on it. The wavelength of light is transmitted to the optical pressure sensor, wherein a pressure-sensitive mirror is positioned within an interferometer. As the position of the mirror is changed by the pressure acting on it, the gap within the interferometer changes, causing the interference of the wavelength of light within the interferometer to change. The pressure is determined as a function of the interference by comparing the interfered light signal with a predetermined value. However, noise and losses in the light signal occur when the wavelength of light is transmitted over large distances. The interfered light signal being compared with the predetermined value is not the identical signal output by the sensor, due to the associated losses and noise occurring in the signal. Inaccurate pressure measurements can result from this type of pressure sensor.

There is a need for a nonelectric and contactless pressure sensor which does not suffer from the detrimental effects associated with prior pressure sensors requiring electrical connection. Moreover, there is a need for an extremely accurate, compact optical pressure sensor which is not affected by losses associated with transmitting the optical signal.

OBJECTS AND SUMMARY OF THE INVENTION

It is a primary object of the present invention to overcome the aforementioned shortcomings associated with the prior art.

Another object of the present invention is to provide a nonelectric pressure sensor which minimizes the effects of severe environments and elevated temperatures on the sensitivity of the pressure sensor.

Yet another object of the present invention is to provide a compact, low cost, and accurate optical pressure sensor.

A further object of the present invention is to provide an optical pressure sensor which allows extremely accurate pressure measurements to be obtained at remote locations by accounting for noise and losses associated with transmitting an optical pressure signal over large distances.

It is yet another object of the present invention to provide an optical pressure sensor which utilizes a reference signal transmitted along with the optical pressure signal from the remote location in order account for such noise and losses associated with the distance the signals are transmitted.

It is still a further object of the present invention to provide an array of optical pressure sensors that allow accurate pressure measurements to be determined at various remote locations and transmitted along a single optical path.

These as well as additional objects and advantages of the present invention are achieved by providing a pressure measuring device and method which utilizes optical, non-acoustic pressure sensors with a laser light source which generates a pulsed light signal that is transmitted along a light transmitting cable. An optical coupler is connected to the light transmitting cable for branching off at least a portion of the pulsed light signal traveling through the light transmitting cable. An optical pressure sensor is connected to the optical coupler, wherein the branched off portion of the pulsed light signal is transmitted into the optical pressure sensor. The optical pressure sensor receives the branched off portion of the pulsed light signal and reflects a pressure indicating signal back into the optical coupler. The pressure indicating signal is a function of a pressure acting on the optical pressure sensor. The branched off portion of the pulsed light signal traveling through the optical coupler is also delivered to a pressure insensitive reflector connected to the optical coupler. The pressure insensitive reflector receives the branched off portion of the pulsed light signal and reflects a reference signal substantially identical to the branched off portion of the pulsed light signal back into the optical coupler. The pressure indicating signal and the reference signal are reflected through the optical coupler into the light transmitting cable as a pair of non-overlapping pulsed signals. A signal detector is attached to the light transmitting cable for retrieving the pressure indicating signal/reference signal pair traveling through the light transmitting cable. The retrieved pressure indicating signal is compared with the retrieved reference signal to determine the pressure acting upon the optical pressure sensor, wherein a signal indicative of the determined pressure is output.

In an alternative embodiment, a plurality of optical couplers are attached to the light transmitting cable at multiple locations spaced apart from one another in order to branch off at least a portion of the pulsed light signal at such locations along the light transmitting cable. Each of the plurality of optical couplers includes a respective optical pressure sensor and a pressure insensitive reflector, so that a plurality of pairs of non-overlapping signals are transmitted into the light transmitting cable. This allows pressure to be measured at multiple locations along the optical cable. The plurality of pairs of non-overlapping signals are time-division multiplexed so that each pair of signals may be retrieved from a single light transmitting cable without the pairs of signals interfering with one another.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an accurate and cost-effective array of optical pressure sensors.

Figure 1:
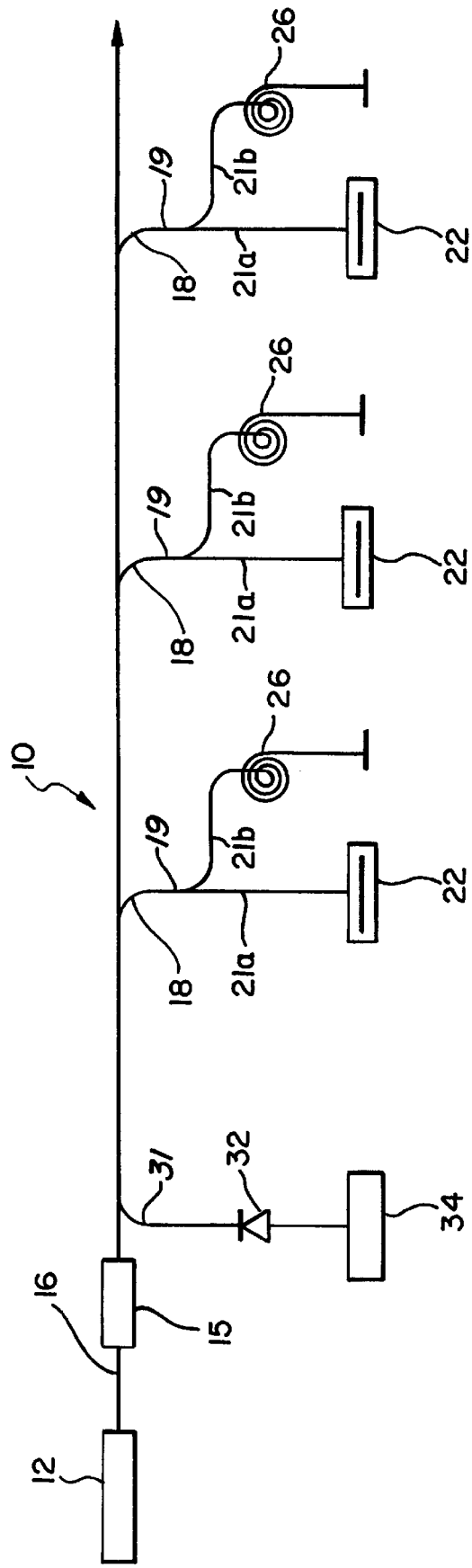
FIG. 1 is a schematic illustration of a preferred embodiment of the TDM array of optical pressure sensors of the present invention.
Figure 2:
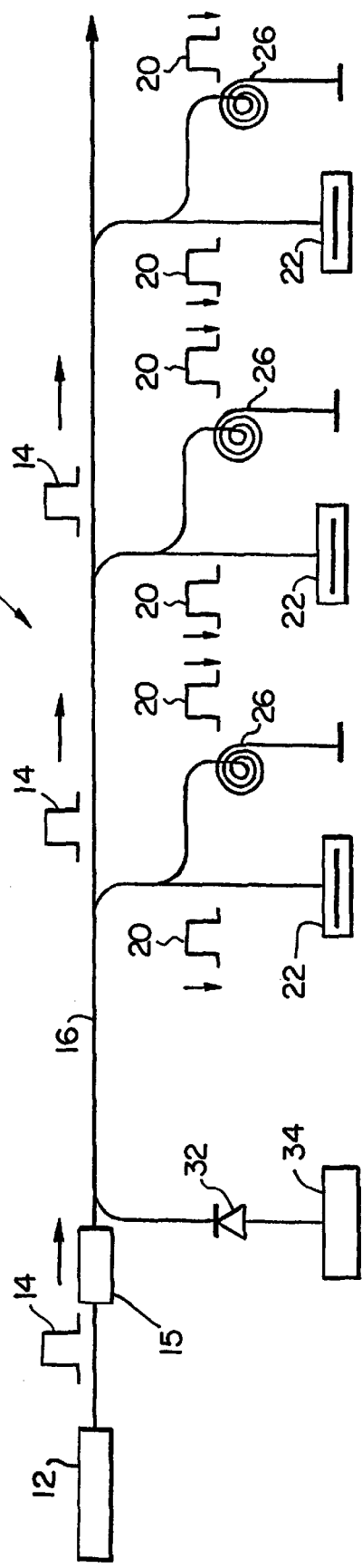
FIG. 2 is a schematic illustration of a pulsed light signal traveling through the light transmitting cable to the array of optical pressure sensors shown in FIG. 1.

Referring now to FIGS. 1 and 2, a schematic layout of a preferred embodiment of a pressure measuring device 10 of the present invention is illustrated. The pressure measuring device 10 includes a laser light source 12 which generates a pulsed light signal 14 and emits the pulsed light signal 14 into a light transmitting cable 16. The pulsed light signal 14 is transmitted along the light transmitting cable 16, such as a fiber optic cable, connected to the laser light source 12. In the preferred embodiment of the present invention, the light transmitting cable 16 is formed as a single mode optical fiber. However, it is understood to those skilled in the art of optical transmission that other similar optically transmitting cables may be utilized. The laser light source 12 is preferably a distributed feedback (DFB) semiconductor laser or similar light source. The pulsed light signal 14 preferably has a wavelength between 1.3 to 1.55 microns due to the low transmission losses and flexibility of the pulsed light signal 14 at such wavelengths. However, other wavelengths having similar characteristics may also be used.

An optical coupler 18 is connected to the light transmitting cable 16 for branching off at least a portion 20 of the pulsed light signal 14 traveling through the light transmitting cable 16. The optical coupler 18 may include any type of fused fiber coupler which taps light off from light traveling through another fiber. The branched off portion 20 of the pulsed light signal 14 is passed through an optical splitter 19 in order to evenly divide the branched off portion 20 of the pulsed light signal 14 into two independent fiber channels 21a and 21b. Optical splitter 19 may comprise a bidirectional 3 dB coupler, known as a Y coupler or 3 dB splitter, made of standard single mode fiber. The optical splitter 19 has two separate outputs, 21a and 21b, each of which receives half of the branched off portion 20 of the pulsed light signal 14 supplied to the optical splitter 19. An optical pressure sensor 22 is connected to the optical coupler 18 through optical splitter 19 and its output 21a, wherein the output signal 21a is transmitted into the optical pressure sensor 22.

Figure 3:
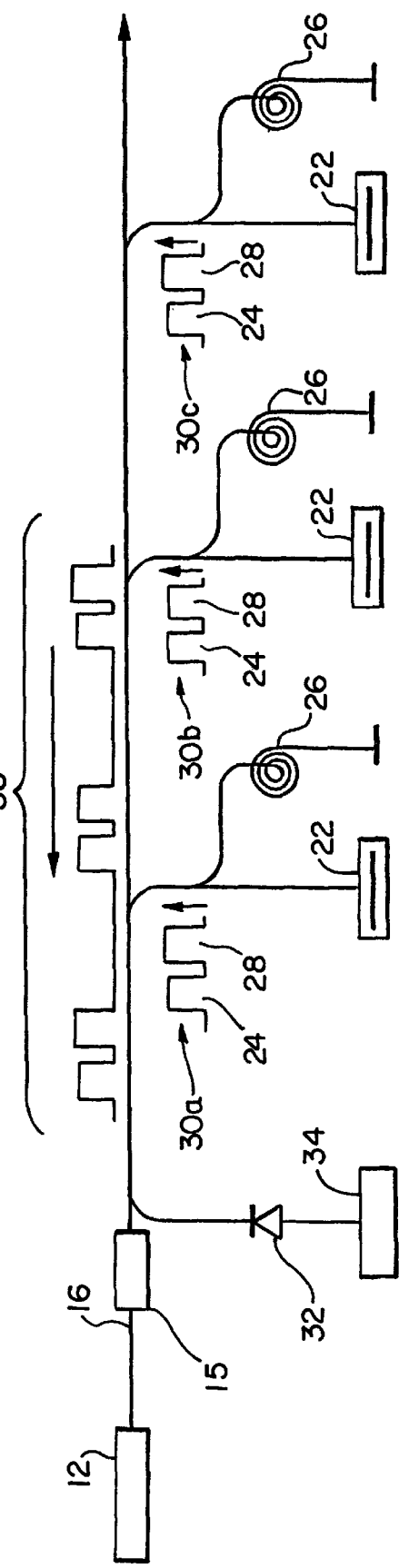
FIG. 3 is a schematic illustration of the return signals from the array of optical pressure sensors shown in FIG. 1.

The optical pressure sensor 22 is preferably a compact Fabry-Perot optical pressure of the type disclosed in the article, "A Silicon Pressure Sensor With An Interferometric Optical Readout," by B. Hälg published in *Transducers '91, 91 Int. Conf. Solid State Sens. Actuators,* International Conference on Solid-State Sensors and Actuators, San Francisco, Calif., Jun. 24–28, 1991 (IEEE cat. n. 91CH2817-5, pp. 682–684). The optical pressure sensor 22 includes a Fabry-Perot interferometer having a variable-gap located between a pressure-sensitive reflective silicon micromembrane and a fixed, partially-transparent mirror. The output signal 21a transmitted into the optical pressure sensor 22 travels through the fixed mirror into the gap where the output signal 21a is reflected off of the silicon micromembrane back into the gap and exits the interferometer through the partially-transparent mirror. The output signal 21a interferes with itself upon exiting the gap in the optical pressure sensor 22, where interference occurs sinusoidally and the phase of the interference is controlled by the gap between the reflective surfaces. Thus, the amount of signal interference depends upon the width of the gap between the reflective surfaces. The width of the gap varies with the movement of the silicon micromembrane, whose position is a function of the pressure acting on the micromembrane. The phase of the interference occurring in the output signal 21a is also a function of the pressure acting on the optical pressure sensor 22. The interfered portion 24 of the ouput signal 21a is reflected out of the optical pressure sensor 22 back into the optical splitter 19 as shown in FIG. 3, wherein the interfered portion 24 is a pressure indicating signal. A graded index (GRIN) rod or other similar lens may be positioned just before optical pressure sensor 22 to provide an efficient coupling of light from the fiber into optical pressure sensor 22 and back into the fiber, so that the output signal 21a and the interfered portion 24 of the output signal 21a pass through the GRIN rod when respectively entering and exiting the optical pressure sensor 22.

The output signal 21b which is split from the branched off portion 20 of the pulsed light signal 14 by the optical splitter 19 is delivered to a pressure insensitive reflector 26 connected to the optical splitter 19. The pressure insensitive reflector 26 reflects a reference signal 28 substantially identical to the output signal 21b, and thus output signal 21a, back into the optical splitter 19. The pressure insensitive reflector may include a fixed end mirror or other similar light reflecting device. The pressure indicating signal 24 and the reference signal 28 are reflected back into the optical splitter 19, where they are combined as a pair of non-overlapping pulsed signals 30. The lengths of the travel paths for output signals 21a and 21b are mismatched, so that it takes longer for reference signal 28 to be reflected back to the optical splitter 19 than pressure indicating signal 24 to ensure that the two signals do not overlap. The pair of non-overlapping pulsed signals 30 propagate through optical coupler 18 and into the light transmitting cable 16.

The pair of non-overlapping pulsed signals 30 will traverse along the light transmitting cable 16 in an opposite direction as that of the pulsed light signal 14, where the pair of non-overlapping pulsed signals 30 will travel toward the laser light source 12, as shown in FIG. 3. The direction of propagation of the various signals is indicated by the directional arrows shown in FIGS. 2 and 3. An optical coupler 31, similar to optical coupler 18, branches off the pair of non-overlapping pulsed signals 30 and delivers the signal pair 30 to a signal detector 32, such as a photodiode receiver or other similar device, in order to measure the intensity of the light signals received. The signal detector 32 receives the pressure indicating signal/reference signal pair 30 traveling through the light transmitting cable 16, determines the intensity of the received signals, and provides corresponding output signals to a processing device 34, such as a microprocessor, CPU, or similar device, attached to the signal detector 32. The processing device 34 compares the intensity of the received pressure indicating signal 24 with the intensity of the retrieved reference signal 28, by generating a ratio of the pressure indicating signal 24 with respect to the reference signal 28, to determine the pressure acting upon the optical pressure sensor 22. The ratioed signal may be compared with predetermined values stored in the processing device 34 to determine the measured pressure. Processing device 34 may receive a multitude of pairs of non-overlapping pulsed signals 30 and obtain an average value for the measured pressure, such as by integrating the received signals 30 over time. This allows more accurate values to be obtained for the measured pressure value for each optical pressure sensor 22, since the average value will account for minor deviations in the measured pressure.

As described above, the pressure indicating signal 24 reflected from optical pressure sensor 22 is a function of the pressure acting on the optical pressure sensor 22, wherein the phase of the interference of the output signal 21a of branched off portion 20 occurring within the optical pressure sensor 22 is dependent upon the variation of the gap between the reflective surfaces in the optical pressure sensor 22. Pulsed light signal 14 propagates into the optical pressure sensor, and the intensity of the pressure indicating signal 24 reflected out of optical pressure sensor 22 varies sinusoidally with the variation in gap. The output signal 21a reflecting within optical pressure sensor 22 will interfere either constructively or destructively with itself, depending upon the width of the gap and wavelength of output signal 21a. By measuring the intensity of the pressure indicating signal 24 reflected out of optical pressure sensor 22, the phase of interference in the output light signal 21a can be determined, which allows the width of the gap and, in turn, the pressure acting of the optical pressure sensor 22 to be determined.

In order to precisely determine the intensity of the pressure indicating signal 24 exiting the optical pressure sensor 22 as compared to the intensity of the branched off portion 20 entering the optical pressure sensor 22, the pressure insensitive reflector 26 reflects a reference signal 28 substantially identical to the output signal 21a received by the optical pressure sensor 22. By comparing the pressure indicating signal 24 with this reference signal 28, losses and noise are compensated for which typically affect a signal being transmitted over large distances. Since the branched off portion 20 of pulsed light signal 14 is identically split into output signals 21a and 21b which are transmitted to both the optical pressure sensor 22 and the reflector 26, respectively, both the pressure indicating signal 24 and the reference signal 28 reflected back into the light transmitting cable 16 will have been subjected to the same losses incurred by the branched off portion 20 of the pulsed light signal 14. Similarly, both the pressure indicating signal 24 and the reference signal 28 will incur the same losses and noise as the are transmitted back to the signal detector 32. Thus, reference signal 28 allows for a more accurate method of measuring the intensity of the pressure indicating signal 24, where use of a reference signal 28 propagating along with its associated pressure indicating signal 24 provides the ability to measure small changes in intensity of the pulsed light signal 14 by accounting for transmission noise and losses.

As shown in FIGS. 1 through 3, an array of optical pressure sensors 22 may be utilized to measure a plurality of pressures at multiple locations along the light transmitting cable 16. In this alternative embodiment of the present invention, a plurality of optical couplers 18 are attached to the light transmitting cable 16 at various locations spaced apart from one another in order to branch off at least a portion of the pulsed light signal 14 at such locations. The propagation of the pulsed light signal 14 along the light transmitting cable 16 and throughout the array of optical pressure sensors 22 is illustrated in FIGS. 2 and 3. Each of the plurality of optical couplers 18 includes a respective optical splitter 19, optical pressure sensor 22, and pressure insensitive reflector 26 connected thereto, so that a plurality of pairs of non-overlapping signals 30a, 30b, 30c, etc. are reflected back into the light transmitting cable 16. The plurality of pairs of non-overlapping signals 30a, 30b, 30c, etc. propagate to processing device 34 where a ratioed signal is determined for each signal pair 30a, 30b, 30c, etc. This allows a pressure measurement to be obtained independent of the location of the pressure sensor, since the use of the reference signal 28 accounts for propagation noise and losses.

The plurality of pairs of non-overlapping signals 30a, 30b, 30c, etc. are time-division multiplexed as a pulsed return signal 36, so that each pair of signals 30 may be retrieved from a single mode optical fiber 16 without the pairs of signals 30a, 30b, 30c interfering with one another. Thus, the output from the various sensors does not need to be modulated in order to obtain individual pressure measurements from the various sensors, as was often required in prior pressure sensor arrays. Furthermore, the time-division multiplexing of the signal used in the present invention, allows a single pulsed light signal 14 to be transmitted and multiple pairs of non-overlapping signals 30 to be returned along a single mode fiber. Thus, multiple fibers are not required, where previously a separate fiber would need to be connected to each separate pressure sensor.

The pulsed light signal 14 should optimally have a linewidth of a couple of GHz. Too narrow of a linewidth can cause polarization problems, while larger linewidths allow the pulsed light signal to be depolarized. However, too broad of a linewidth is not desirable due to noise. The pulsed light signal 14 should be as polarization insensitive as possible, where the pulsed light signal 14 may be passed through a polarization scrambling device 15 to scramble the polarization of the light signal as it exits its source. Any technique for depolarizing light signal 14 may be utilized by polarization scrambling device 15. For instance, polarization scrambling device 15 may split light signal 14 into two orthogonal, linearly polarized signals of roughly equal amplitude, and pass the light signals through separate paths having a mismatch between them, so that the orthogonal components of the light signals are delayed with respect to each other. The two signals are combined at the end of the separate paths where they are incoherent with respect to each other, and the incoherent combined signals scramble the polarization of the light signal 14. Polarization scrambling device 15 may utilize a polarization maintaining (PM) interferometer, where the light signal 14 entering polarization scrambling device 15 is split into two signals using a PM coupler. The two signals are transmitted along two mismatched PM fiber legs, respectively. Light signal 14 will be polarized, for example, along the fast axis of the PM fiber, and an input PM coupler will transmit roughly equal amplitudes of this fast axis polarized light into each of the two split signals in the mismatched PM fiber interferometer legs. Between the input PM coupler and an output PM coupler, one of the mismatched PM fiber interferometer legs contains a splice at which point the fiber orientation is rotated 90 degrees about the transmission axis. In this interferometer leg, light is delivered to the output coupler polarized along the slow axis of the PM fiber. The output coupler then combines roughly equal amplitudes of light polarized along the fast and slow axes. As well as being orthogonally polarized to one another, these two signals will be incoherent with respect to one another if the path mismatch between the two fibers is large enough. The light is then unpolarized.

The mismatch between the two PM fiber interferometer legs must be determined with some care. It must be short compared to the length of the pulsed light signal 14, so that the signals overlap almost entirely when they exit the interferometer. The linewidth of the laser light source must be broad enough so that it looses coherence over this mismatch. In the preferred embodiment of the present invention, a pulsed DFB laser is used for the laser light source, since its linewidth of a few GHz is compatible with this method of polarization control.

The amount of pulsed light signal 14 that is branched off at each optical coupler 18 can be variably controlled depending upon the length of the array and the number of optical pressure sensors 22 comprising the array. This allows the pressure indicating signal 24 returning from each of the optical pressure sensors to be equalized. Further, if it is desirable to have the optical pressure sensors 22 interchangeably positioned, then the portion 20 of the pulsed light signal tapped off at each optical coupler would be equal to 1/N, where N is the number of optical pressure sensors 22 used. The pressure measuring device 10 of the present invention may handle any number of optical pressure sensors 22, where anywhere from 1–100 optical pressures sensors 22 may be used with a single mode fiber as the light transmitting cable 16.

The pressure measuring device 10 of the present invention utilizes only optical properties to measure pressures at various locations. Thus, electricity does not need to be supplied to each optical pressure sensor 22, so that only an optical fiber needs to be attached to the optical pressure sensors 22. The pressure measuring device 10 of the present invention also utilizes all non-acoustic elements, which allows the pressure measuring device 10 to be used in an acoustical device for pressure measurements independent of the acoustics acting on the pressure sensors.

As can be seen from the foregoing, an array of non-acoustic, optical pressure sensors formed in accordance with the present invention will achieve a compact, cost effective, and nonelectric pressure measuring device capable of measuring pressures at multiple locations using a single optical fiber. Moreover, by forming an array of non-acoustic, optical pressure sensors in accordance with the present invention, accurate pressure measurements sensitive to small changes in pressure can be achieved by using a reference signal transmitted along with a pressure signal to account for noise and losses associated with transmitting an optical signal over large distances.

In each of the above embodiments, the different positions and structures of the pressure measuring device 10 of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A pressure measuring device which utilizes optical, non-acoustic pressure sensors, comprising:
   a laser light source for producing a pulsed light signal;
   a light transmitting cable connected to said laser light source for transmitting said pulsed light signal;
   an optical splitter connected to said light transmitting cable for equally splitting said pulsed light signal into first and second output signals;
   an optical pressure sensor connected to said optical splitter for receiving said first output signal and reflecting a pressure indicating signal back through said optical splitter into said light transmitting cable;
   a pressure insensitive reflector connected to said optical splitter for receiving said second output signal and reflecting a reference signal back through said optical splitter into said light transmitting cable;
   a signal receiving means for receiving said pressure indicating signal and said reference signal from said light transmitting cable; and
   a pressure determining means connected to said signal receiving means for comparing said pressure indicating signal with said reference signal to determine the pressure acting upon said optical pressure sensor.

2. The pressure measuring device of claim 1, wherein said pressure indicating signal and said reference signal are reflected through said optical coupler into said light transmitting cable as a pair of non-overlapping pulsed signals.

3. The pressure measuring device of claim 1, wherein said laser light source is a distributed feedback laser and said pulsed light signal is generated at a wavelength of 1.5 microns or 1.3 microns.

4. The pressure measuring device of claim 1, wherein said optical pressure sensor is a Fabry-Perot optical pressure sensor.

5. The pressure measuring device of claim 4, wherein said Fabry-Perot optical pressure sensor includes a pressure-sensitive movable silicon mirror and a fixed, partially-transparent mirror having a gap where signal interference occurs between signals reflected from said mirrors.

6. The pressure measuring device of claim 1, wherein said pressure insensitive reflector is a fixed end mirror.

7. The pressure measuring device of claim 1, wherein said light transmitting cable is an single mode optical fiber.

8. A pressure measuring device having an array of optical, non-acoustic pressure sensors, comprising:
- a laser light source for producing a pulsed light signal;
- a light transmitting cable connected to said laser light source for transmitting said pulsed light signal;
- a plurality of optical couplers connected to said light transmitting cable for branching off at least a portion of said pulsed light signal from said light transmitting cable at each of said optical couplers;
- each of said plurality of optical couplers having an optical pressure sensor connected thereto for receiving said branched off portion of said pulsed light signal and reflecting a pressure indicating signal back into said optical;
- wherein said optical pressure sensors form an array of optical pressure sensors spaced apart from one another so that pressures may be measured at various locations along said light transmitting cable;
- wherein said pressure indicating signal from each of said optical pressure sensors travel through said optical coupler into said light transmitting cable;
- a signal receiving means for receiving said pressure indicating signals from said light transmitting cable; and
- a pressure determining means connected to said signal receiving means for determining the pressure acting upon said optical pressure sensor from said received pressure indicating signals.

9. The pressure measuring device of claim 8, further comprising:
- an optical splitter connected to each of said plurality of optical couplers for splitting said branched off portion of said pulsed light signal equally in half into first and second output signals;
- a pressure insensitive reflector connected to each of said optical splitters for receiving said second output signal and reflecting a reference signal back through said optical splitter, through said optical coupler, and into said light transmitting cable;
- wherein said each of said optical pressure sensors are connected to respective one of said optical splitters for receiving said first output signal and reflecting said pressure indicating signal back through said optical splitter, through said optical coupler, and into said light transmitting cable.

10. The pressure measuring device of claim 9, wherein said pressure indicating signal and said reference signal travel as a pair of non-overlapping pulsed signals through said optical coupler and into said light transmitting cable; said signal receiving means further receiving each of said reference signals along with its associated pressure indicating signal; and
- wherein said pressure determining means compares said pressure indicating signal with its associated reference signal to determine the pressure acting upon said optical pressure sensor.

11. The pressure measuring device of claim 10, wherein said pairs of non-overlapping pulsed signals are time-division multiplexed so that said pairs of non-overlapping pulsed signals may sent along a single mode optical fiber without interfering with one another.

12. The pressure measuring device of claim 8, wherein said laser light source is a distributed feedback laser and said pulsed light signal is generated at a wavelength of 1.5 microns or 1.3 microns.

13. The pressure measuring device of claim 8, wherein said optical pressure sensor is a Fabry-Perot optical pressure sensor.

14. The pressure measuring device of claim 13, wherein said Fabry-Perot optical pressure sensor includes a pressure-sensitive movable silicon mirror and a fixed, partially-transparent mirror having a gap where signal interference occurs between signals reflected from said mirrors.

15. The pressure measuring device of claim 8, wherein a graded index (GRIN) rod is connected to a respective optical coupler to effect efficient coupling of light between said light transmitting cable and said optical pressure sensors.

16. A method of measuring a pressure at a remote location using a non-electrical optical pressure sensor, comprising the steps of:
- generating a pulsed light signal from a laser light source;
- transmitting said pulsed light signal through a light transmitting cable connected to said laser light source;
- branching off at least a portion of said pulsed light signal from said light transmitting cable;
- splitting said branched off portion of said pulsed light signal equally in half into first and second signals and delivering said first and second signals to an optical pressure sensor and a pressure insensitive reflector, respectively; wherein said optical pressure sensor reflects a pressure indicating signal back into said light transmitting cable and said pressure insensitive reflector reflects a reference signal back into said light transmitting cable;
- receiving said pressure indicating signal and said reference signal from said light transmitting cable; and
- comparing said pressure indicating signal with said reference signal to determine the pressure acting upon said optical pressure sensor.

17. The method as set forth in claim 16, further comprising the step of transmitting said pressure indicating signal and said reference signal as a pair of non-overlapping pulsed signals into said light transmitting cable.

18. The method as set forth in claim 17, further comprising the steps branching off at least a portion of said pulsed light signal from said light transmitting cable at multiple locations along said light transmitting cable;
- delivering each of said branched off portions of said pulsed light signal to a respective optical pressure sensor and a respective pressure insensitive reflector; wherein each respective optical pressure sensor/pressure insensitive reflector pair reflects a pressure indicating signal and a reference signal as a pair of non-overlapping pulsed signals back into said light transmitting cable;
- receiving said pairs of non-overlapping pulsed signal returns from said light transmitting cable;
- comparing said pressure indicating signals with said respective reference signals to determine the pressure acting upon each of said optical pressure sensors.

19. The method as set forth in claim 18, further comprising the step of time-division multiplexing said pairs of non-overlapping pulsed signal returns in order to allow said pairs of pulsed signal returns to be transmitted through said light transmitting cable without interfering with one another.

* * * * *